US007951255B2

(12) United States Patent
Ikeda et al.

(10) Patent No.: US 7,951,255 B2
(45) Date of Patent: May 31, 2011

(54) WATER PRESSURE TRANSFER METHOD AND WATER PRESSURE TRANSFER ARTICLE

(75) Inventors: Wataru Ikeda, Shizuoka (JP); Nobuyuki Otaki, Shizuoka (JP); Tomomi Kiyotaki, Shizuoka (JP)

(73) Assignee: Taica Corporation, Tokyo (JP)

( * ) Notice: Subject to any disclaimer, the term of this patent is extended or adjusted under 35 U.S.C. 154(b) by 829 days.

(21) Appl. No.: 10/558,990

(22) PCT Filed: Jun. 2, 2004

(86) PCT No.: PCT/JP2004/007624
§ 371 (c)(1), (2), (4) Date: Dec. 1, 2005

(87) PCT Pub. No.: WO2004/108434
PCT Pub. Date: Dec. 16, 2004

(65) Prior Publication Data

US 2007/0051458 A1 Mar. 8, 2007

(30) Foreign Application Priority Data

| | | | |
|---|---|---|---|
| Jun. 2, 2003 | (JP) | ................................ | 2003-156439 |
| Jun. 2, 2003 | (JP) | ................................ | 2003-156441 |
| Dec. 9, 2003 | (JP) | ................................ | 2003-409874 |
| Feb. 10, 2004 | (JP) | ................................ | 2004-032954 |

(51) Int. Cl.

| | |
|---|---|
| ***B32B 37/10*** | (2006.01) |
| ***B32B 37/14*** | (2006.01) |
| ***B32B 38/14*** | (2006.01) |
| ***B05D 1/20*** | (2006.01) |
| ***B44C 1/165*** | (2006.01) |
| ***C08J 7/04*** | (2006.01) |
| *B44C 1/175* | (2006.01) |
| *B44C 1/24* | (2006.01) |
| *B32B 27/00* | (2006.01) |

(52) U.S. Cl. .................... 156/275.5; 156/230; 156/242; 156/272.2; 156/272.8; 156/277; 427/430.1; 427/512

(58) Field of Classification Search .................. 156/230, 156/242, 272.2, 272.8, 273.7, 275.5, 277; 427/430.1, 512
See application file for complete search history.

(56) References Cited

U.S. PATENT DOCUMENTS 3,907,974 A * 9/1975 Smith .......................... 428/346
(Continued)

FOREIGN PATENT DOCUMENTS

JP 56-082256 A 7/1981
(Continued)

OTHER PUBLICATIONS

Teikoku Printing, "UV Ink Selector—UV PAL"-http://www.teikokuink.com/en/product/inkselector_uv.html.*

(Continued)

*Primary Examiner* — Sonya Mazumdar
(74) *Attorney, Agent, or Firm* — Pearne & Gordon LLP

(57) ABSTRACT

In order to impart, concurrently with the transfer of a decorative layer, a surface protection function able to mechanically and chemically protect the decorative layer to be hydraulic-transferred of an article, a solventless type ultraviolet-curing resin composition is applied onto the dried printed pattern of a transfer film, an article is pushed into water along with the transfer film, with the printed pattern activated by a non-solvent activating component in the ultraviolet (uv)-curing resin composition and its adhesion force reproduced, and a ultraviolet ray is applied to the article to which the printed pattern, now impregnated and completely integrated with the uv-curing resin composition, has been transferred to thereby cure the uv-curing resin composition.

10 Claims, 8 Drawing Sheets

U.S. PATENT DOCUMENTS

| | | | | |
|---|---|---|---|---|
| 4,029,831 | A | 6/1977 | Daunheimer | |
| 4,396,448 | A | 8/1983 | Ohta et al. | |
| 4,490,410 | A * | 12/1984 | Takiyama et al. | 427/504 |
| 5,354,367 | A * | 10/1994 | Pennaz | 522/157 |
| 5,432,258 | A * | 7/1995 | Yoshimura | 428/32.79 |
| 5,560,796 | A * | 10/1996 | Yoshimura | 156/240 |
| 6,551,392 | B1 | 4/2003 | Otaki et al. | |
| 6,554,940 | B2 | 4/2003 | Otaki et al. | |
| 6,653,394 | B1 | 11/2003 | Meisenburg et al. | |
| 6,852,394 | B2 | 2/2005 | Otaki et al. | |
| 6,902,642 | B2 * | 6/2005 | Kawaharada et al. | 156/239 |
| 2003/0108675 | A1 | 6/2003 | Kawaharada et al. | |

FOREIGN PATENT DOCUMENTS

| | | | |
|---|---|---|---|
| JP | 56-166090 | A | 12/1981 |
| JP | 64-022378 | A | 1/1989 |
| JP | 04-197699 | A | 7/1992 |
| JP | 04197699 | A * | 7/1992 |
| JP | 05-016598 | A | 1/1993 |
| JP | 06-166300 | A | 6/1994 |
| JP | 06166300 | A * | 6/1994 |
| JP | 7276899 | A | 10/1995 |
| JP | 2007-1693 | A | 3/2000 |
| JP | 2001-277790 | A | 10/2001 |
| JP | 2002-172895 | A | 6/2002 |
| JP | 2003-065668 | A | 3/2003 |
| WO | 98/47973 | A1 | 10/1998 |
| WO | 98/55552 | A1 | 12/1998 |
| WO | 00-32666 | A1 | 6/2000 |

OTHER PUBLICATIONS

Teikoku Printing, “Q&A Regarding Printing and Forming”-http://www.teikokuink.com/en/product/printfaq.html#q2-01.*

Wypych, George, “Handbook of Fillers”, ChemTec Publishing (2000), pp. 62-71.

* cited by examiner (A)

(B)

WATER PRESSURE TRANSFER METHOD AND WATER PRESSURE TRANSFER ARTICLE

TECHNICAL FIELD

This invention relates to a water pressure transfer method adapted to improve a surface property of a decorative layer, a surface protection layer or a combination thereof formed on an article by the water pressure method and an article formed by the water pressure transfer method.

BACKGROUND OF TECHNOLOGY

The water pressure transfer method is the one in which a transfer film having a predetermined water-insoluble print pattern applied onto a water-soluble film is sequentially supplied and floated on a water surface which flows within a transfer tub and made wet with the water and an article (a transferred body or a body to be pattern-transferred) is immersed into the water within the transfer tub while it contacts the transfer film whereby the print pattern of the transfer film is transferred onto the surface of the article using the water pressure to thereby form a decorative layer. In the case where the print pattern is dried, it is required to apply an active agent to the print pattern so as to activate the ink of the print pattern in order to get the same wet state of the ink (the state where it has an adhesion) as the state of the ink immediately after being printed. In order to provide wear resistance, weather resistance (including solvent resistance, chemical resistance, etc.) to the decorative layer formed by transferring the print pattern on the surface of the article, it is necessary to form a transparent surface protection layer (topcoat layer) on the decorative layer.

In one prior art, this surface protection layer is formed by applying by spray an ultraviolet ray hardening type protection coating material onto the decorative layer after transferring the print pattern, removing the water-soluble film out of the surface of the article and drying the article, and then irradiating an ultraviolet ray on the ultraviolet ray hardening type protection coating material to thereby harden the protection coating material.

However, the method of applying the protection coating material on the surface of the article by spray makes difficult the uniform application of the surface protection layer on the whole surface of the article and in addition thereto causes dirt and dust to be adhered onto the decorative layer formed by transferring the print pattern because the protection layer is applied after transferring the print pattern, water-washing and drying the article. Furthermore, since the ultraviolet ray is irradiated onto the protection coating material after removing the article out of an area where the protection coating material is applied, dirt and dust tend to be adhered to the decorative layer, which causes a surface appearance to be deteriorated.

In another prior art JP4-197699A, there has been proposed a method in which water pressure transfer of the print pattern and formation of the surface protection layer are carried out at the same time (see the first patent document). This method is the one in which a transfer film with a protection layer is formed by applying a transparent or semi-transparent surface protection layer of water-insoluble resin on a water-soluble film and then a water-insoluble print layer on the surface protection layer and the transfer film with the protection layer is transferred under water pressure onto an article (a body to be pattern-transferred).

According to this method, since the surface protection layer and the print layer on the water-soluble film are simultaneously transferred on the surface of the article when it contacts the transfer film using water pressure on the water pressure transfer, this method can omit the steps of applying and hardening the protection coating material after the transfer process, which have been required in the first-mentioned conventional art, can avoid dust from adhering between the decorative layer and the surface protection layer and can have little possibility that the thickness of the surface protection layer becomes uneven.

In this manner, this method can be advantageously used because the surface protection layer is formed at the same time when the print layer is transferred whereby the steps of operation can be simplified and in addition thereto the appearance of the decorative layer is never deteriorated and also the surface protection layer can provide wear resistance to the surface of the print layer of the article to thereby physically protect it because the surface protection layer is formed of a protecting agent such as butyl-methacrylate or ethyl-methacrylate, but since the protecting agent has low solvent resistance, when the surface protection layer is dissolved when it contacts various medicines, its surface protection function is reduced and therefore the surface protection layer disadvantageously has the low weather resistance and the poor chemical protection.

There has been proposed another prior art, JP2003-200698A, that is similar to the second prior art, but is different from the latter in that the material for the surface protection layer of the second prior art is replaced by a resin to be hardened by an ultraviolet ray, etc (see the patent document 2).

In the third prior art, since the resin hardened by the ultraviolet ray etc. is used for the surface protection layer, it will physically and chemically protect the decorative layer in an effective manner, but it has some undesirable disadvantages when the adhesion of the print pattern, which is the uppermost surface of the transfer film is recovered or reproduced as described later.

More particularly, although it is common on the aforementioned first to third prior arts, an activating agent or a thinner is applied to the print pattern and also to the surface protection layer (referring to the third prior art) of the transfer film to recover the adhesion of the print pattern and the surface protection layer when the transfer should be carried out, but since the activating agent or the thinner recovers the adhesion of the print pattern by using an organic solvent contained in the activating agent or the thinner, the time in which the solvent ingredient completely volatilizes and the drying condition are required to be considered as the process conditions and a bad influence may be provided to the quality of the water pressure transfer article if the solvent ingredient remains in the print pattern or the surface protection layer. Furthermore, since the organic solvent is emitted into the atmosphere during the operation or inhaled by the human body, using the organic solvent for activating the print pattern or the surface protection layer causes organic air pollution or healthy injury of laborers and this becomes such a problem as should be solved immediately.

As the inventors tried to directly apply such an ultraviolet ray hardening type coating material as used in the first prior art, which is also an eco-friendly coating material, they could discover the recovery of temporary adhesion of the ink in the print pattern of the transfer film, but also find that when it tries in a continuation work during the water pressure transfer process, it becomes poor transfer due to the reduced adhesion of the print pattern. It has been discovered that as the same trial is performed using an ultraviolet ray hardening type ink which contains the same ultraviolet ray hardening resin composite as the ultraviolet ray hardening type coating material does, but contains no coloring agents, the adhesion of the ink in the print pattern can be recovered and that the transfer can be performed without reduction of the adhesion even during the transfer process.

In case of the water pressure transfer, not only the ink in the print pattern has the wet state returned so as to recover the adhesion of the ink, but also the water-soluble film having the print pattern supported thereon is made also wet with the water in the transfer tub whereby both of the print pattern and the water-soluble film are required to be easily attached onto and around the surface of the article when it is forced into the water. Thus, the article should be forced underwater at the time when the harmony of the wet states of both of the print pattern and the water-soluble film is obtained and the adhesion of the print pattern also adapted to attach the print pattern onto the article should be maintained until the transfer is completed.

The inventors believe that the difference between these trial results is caused by the difference between the composition of the ultraviolet ray hardening type coating material and that of the ultraviolet ray hardening type ink as the products different from their usage even though they contain the same ultraviolet ray hardening resin composite. In addition thereto, they believe that there is the difference in that the ultraviolet ray hardening type coating material contains low boiling point solvent, but the ultraviolet ray hardening type ink generally contains less solvent, and therefore, as the ultraviolet ray hardening type coating material is applied to the print pattern, the original adhesion of the print pattern can be recovered by the solvent in the coating material, but the adhesion will be reduced due to the evaporation of the solvent when the transfer is carried out and since the ultraviolet ray hardening type ink has no solvent, any non-solvent composite will serve to recover the print pattern. This invention has been made by repeating various experiments under the aforementioned suppositions.

There will be conceived a method of transferring a surface protection layer on an article under water pressure by using a transfer film having the surface protection layer formed by applying and drying a surface protection agent such as protection coating material or ultraviolet ray hardening resin composite on a water soluble film. However, it is also difficult to form the surface protection layer having all excellent properties of wear resistance, thermal resistance and medicine resistance by this water pressure transfer method and there occurs the same problems as the method of decorating the article by transferring the print pattern on the article when the adhesion of the surface protection layer should be recovered.

An object of the invention is to provide a water pressure transfer method adapted to impart mechanical and chemical surface protection functions, such as wear resistance, solvent resistance, medicine resistance, weather resistance, etc., to a transfer layer such as a decorative layer itself, a surface protection layer or a combination thereof on an article simultaneously with transfer of the transfer layer.

Another object of the invention is to provide a water pressure transfer method adapted to impart mechanical and chemical surface protection functions, such as wear resistance, solvent resistance, medicine resistance, weather resistance, etc., to a surface of an article.

Another object of the invention is to provide a water pressure transfer method adapted to impart sufficient adhesion to an ink of a print pattern of a transfer film without any organic solvent whereby such problems as air pollution due to use of the organic solvent and healthy injury of laborers can be avoided.

Further object of the invention is to provide a water pressure transfer article obtained by imparting surface protection functions of mechanically and chemically protecting a transfer layer such as a decorative layer, a surface protection layer or a combination thereof on the article simultaneously with transfer of the transfer layer.

Further object of the invention is to provide a water pressure transfer article having no dust attached thereto without any problem of air pollution and healthy injury of laborers whereby the article has a good property.

Further object of the invention is to provide a water pressure transfer article having excellent surface protection properties.

Further object of the invention is to provide a water pressure transfer article adapted to have excellent surface protection properties imparted on an article without any problem of air pollution and healthy injury of laborers.

DISCLOSURE OF THE INVENTION

According to a first feature of the invention, there is provided a water pressure transfer method comprising the steps of making wet a transfer layer of a transfer film having said transfer layer in dry state provided on a water-soluble film and thereafter immersing an article together with said transfer film so as to force a surface of said article onto said transfer layer whereby said transfer layer is transferred under water pressure to said surface of said article, characterized in that a non-solvent type ultraviolet ray or electronic ray hardening resin composite including photo-polymerization monomer (referred to as "hardening resin composite" later) is coated on said transfer layer to thereby make it wet and after said transfer layer is transferred, an ultraviolet ray or electronic ray is irradiated on said article to thereby harden said hardening resin composite whereby the transfer layer is formed on said surface of said article.

In the first feature of the invention, the transfer layer may be a print pattern whereby a decorative layer is formed on the surface of said article, it may be is a combination of a print pattern and a top-coating surface protection layer provided under the print pattern whereby a decorative layer having the top-coating surface protection layer thereon is formed on the surface of said article or it may be a surface protection layer whereby the surface protection layer is formed on the surface of said article.

In the first feature of the invention, in the case where the transfer layer is the print pattern of ink, the adhesion of the print pattern can be fully recovered by the non-solvent activating component of the ultraviolet ray hardening resin composite, which may be typically the photo-polymerization monomer so that the adhesion has the same degree as the print pattern immediately after the print pattern is printed on the water-soluble film. Since the recovery of the adhesion can be made without any organic solvent, there occurs no problem of air pollution or healthy injury of laborers due to the organic solvent used.

Since the non-solvent activating component of the ultraviolet ray hardening resin composite such as the photo-polymerization monomer is hardened in the state where it permeates the ink of the print pattern so as to be mixed with the ink and therefore in the state where the non-solvent ultraviolet ray hardening resin composite is wholly united with the print pattern, the decorative layer itself on the article has mechanical and chemical surface protection functions such as wear resistance, solvent resistance, medicine resistance and weather resistance and so on applied thereto.

Since the first feature of the invention lies in recovering the adhesion of the print pattern by the non-solvent activating component of the non-solvent type ultraviolet hardening resin composite, there occurs no problem of air pollution or health injury of laborers due to the organic solvent used. Also, since the ultraviolet ray hardening resin composite and the transfer layer are hardened while they are wholly united with each other in, in the case where the transfer layer is the combination of the print pattern and the top coat layer, the decorative layer itself on the article has mechanical and chemical surface protection functions such as wear resistance, solvent resistance, medicine resistance and weather resistance and so on applied thereto.

The surface of the decorative layer can be fully protected by the topcoat layer transferred under water pressure on the decorative layer at the same time when the latter is transferred together with the surface protection functions such as the solvent resistance and so on imparted to the decorative layer and in addition thereto, since one portion of the ultraviolet ray hardening resin composite for recovering the adhesion also permeates the top-coating protection layer, the adhesion property of the topcoat layer and the decorative layer can be improved. Especially, as the topcoat layer is of ultraviolet ray hardening resin composite, the mechanical and chemical surface protection can be strengthened by the association of the ultraviolet ray hardening resin composite wholly united with the decorative layer by being applied for recovery of the adhesion thereof and the top-coating ultraviolet ray hardening resin composite. The topcoat layer imparts the depth of the surface appearance of the article thereto.

According to a second feature of the invention, there is provided a water pressure transfer article characterized by having a surface formed by the water pressure transfer method according to the first feature of the invention.

BRIEF DESCRIPTION OF THE DRAWINGS

FIG. 2A is a cross sectional view of a transfer film, FIG. 2B is a cross sectional view of the state where a non-solvent ultraviolet ray hardening resin composite is applied on the transfer film, FIG. 2C is a cross sectional view of the state where the transfer film of FIG. 2B is floated on the surface of water, FIG. 2D is a cross sectional view of the state immediately before an article to transfer a print pattern under water pressure is forced underwater, FIG. 2E is a cross sectional of the state where an ultraviolet ray is irradiated on the article after water pressure transfer, FIG. 2F is a cross sectional view of the state where a water soluble film is water-washed and FIG. 2G is a cross sectional view of the state where the surface of the article is being dried.

FIG. 4A is a cross sectional view of a transfer film for a topcoat layer and FIG. 4B is a cross sectional view of the state immediately before the article of FIG. 3 is forced underwater in order to apply a topcoat to the article using the transfer film of FIG. 4A.

FIG. 7A is a cross sectional view of a transfer film, FIG. 7B is a cross sectional view of the state where an ultraviolet ray hardening resin composite is applied on the transfer film, FIG. 7C is a cross sectional view of the state where the transfer film of FIG. 7B is floated on the surface of water, FIG. 7D is a cross sectional view of the state immediately before an article to transfer a print pattern thereon is forced underwater, FIG. 7E is a cross sectional view of the state where an ultraviolet ray is irradiated on the article after water pressure transfer, FIG. 7F is a cross sectional view of the state where a water soluble film is water-washed and FIG. 7G is a cross sectional view of the state where the surface of the article is being dried.

FIG. 9A is a cross sectional view of a surface protection layer transfer film, FIG. 9B is a cross sectional view of the state where an ultraviolet ray hardening resin composite is applied on the surface protection layer of the transfer film, FIG. 9C is a cross sectional view of the state where the transfer film of FIG. 9B is floated on the surface of water, FIG. 9D is a cross sectional view of the state immediately before an non-decorative article to transfer the surface protection layer thereon under water pressure is forced underwater, FIG. 9E is a cross sectional view of the state where an ultraviolet ray is irradiated on the article after water pressure transfer, FIG. 9F is a cross sectional view of the state where a water soluble film is water-washed and FIG. 9G is a cross sectional view of the state where the surface of the article is being dried.

DETAILED DESCRIPTION OF THE INVENTION

Figure 1:
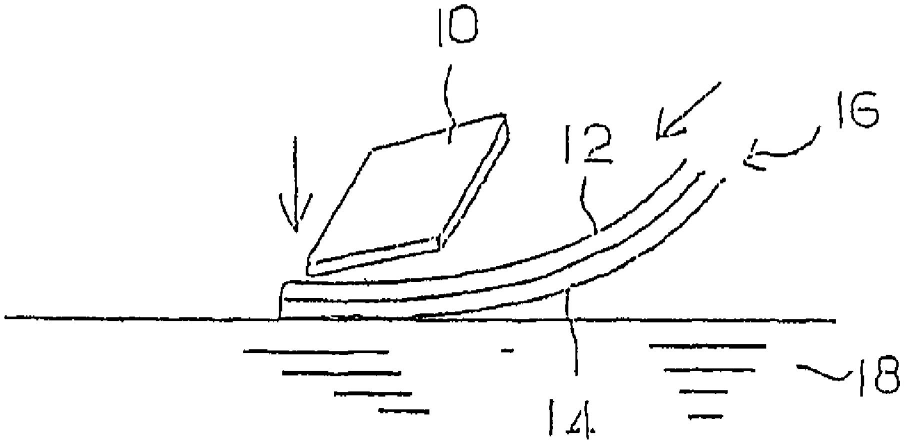
FIG. 1 is an outline view in which a water pressure transfer method used in the invention is briefly illustrated.

Describing embodiments of the invention with reference to the drawings, FIG. 1 briefly illustrates a water pressure transfer method according to a first form of the invention. In the first form of the invention, a transfer layer of a transfer film 16 is described to be a print pattern 12. This water pressure transfer method is the one in which a transfer film 16 comprising a water soluble film 14 having a print pattern 12 applied thereon is floated on water 18 within a transfer bath not shown with the print pattern directed upside and an article 10 to have the print pattern transferred thereon under water pressure is forced underwater through the transfer film 16 whereby the water pressure transfer is accomplished.

The water soluble film 14 is formed of water soluble material having a main ingredient of polyvinyl alcohol, for example, which gets wet and is softened by absorbing water. This water soluble film 14 is softened when it contacts water within the transfer tub and is wound around the article 10 to be decorated whereby the water pressure transfer can be accomplished. The print pattern 12 may be applied on the water soluble film 14 by gravure printing and so on in case of general water pressure transfer. It should be noted that what is meant by the “print pattern” 12 includes plane one (one having no pattern) other than the one originally having a pattern.

Figure 2:
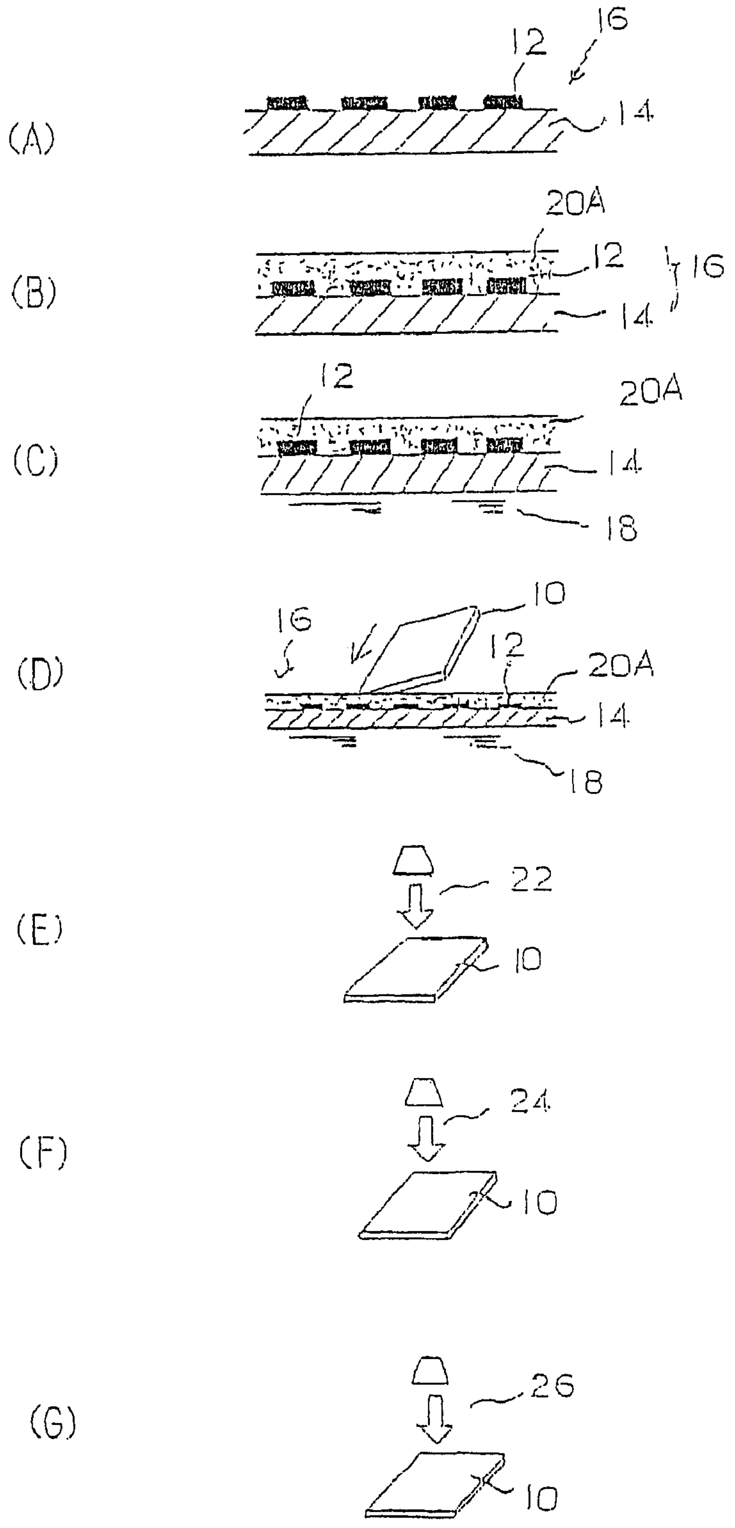
FIG. 2 illustrates a water pressure transfer method according to a first form of the invention in order of steps.

The method according to the first form of the invention is to apply or coat a non-solvent type ultraviolet ray hardening resin composite to the dried print pattern 12 of the transfer film 16 to permeate the print pattern 12 before transferring the print pattern on the article under water pressure. An example of concrete steps of the water pressure transfer method of the invention is illustrated in FIG. 2. In the form of FIG. 2, the operation begins from the state where the print pattern 12 printed on the water soluble film 14 is in a dried condition (see FIG. 2A). Although not shown, in practice, the transfer film 16 is in the form of roll obtained by previously printing the print pattern 12 on the elongated water soluble film 14 and drying the print pattern 12. The transfer film 16 may be used while being continuously fed from the film roll or by cutting it thereafter.

In the form of FIG. 2, the non-solvent type ultraviolet ray hardening resin composite 20A is applied on the dried print pattern 12 of the transfer film 16 of FIG. 2A (see FIG. 2B), the transfer film 16 is floated on a water 18 within a transfer tub in the state where the print pattern 12 is activated by the non-solvent type ultraviolet ray hardening resin composite 20A to thereby recover the adhesion of the print pattern 12 (see FIG. 2C), thereafter an article 10 together with the transfer film 16 is forced underwater so as to force the print pattern 12 containing the non-solvent type ultraviolet ray hardening resin composite 20A against the surface 10S of the article (see FIG. 2D) and an ultraviolet ray 22 is irradiated on the article 10 on which the print pattern 12 containing the non-solvent type ultraviolet ray hardening type resin composite 20A is transferred whereby the non-solvent type ultraviolet ray hardening type resin composite 20A is hardened (see FIG. 2E). Although not shown in the drawings, the article 10 may be forced underwater while it is conveyed by a reverse triangle-like conveyer or supported by a robot arm. In some cases, the step of applying the non-solvent type ultraviolet ray hardening type resin composite 20A on the print pattern 12 (see FIG. 2B) and the step of floating the transfer film 16 on the water (see FIG. 2C) may be reversely carried out whereby the non-solvent type ultraviolet ray hardening type resin composite 20A may be applied by spray on the print pattern of the transfer film 16 which is floated on the water so as to recover the adhesion of the print pattern 12.

What is meant by “ultraviolet ray hardening resin” is a resin to be hardened by chemical action of an ultraviolet ray for a relatively shorter time and takes the form of ultraviolet ray hardening type coating material, ultraviolet ray hardening type ink, ultraviolet ray hardening type adhesives, etc. according to its use. These agents include (1) light polymerization pre-polymer, (2) light polymerization monomer and (3) light (optical) start agent as indispensable ingredients. General ultraviolet ray hardening type ink has no solvents added thereto and is blended with an photopolymerization monomer to serve as a dilution agent. The “ultraviolet ray hardening resin composite”, which is the object of the first form of embodiment of the invention is essentially blended with the photopolymerization pre-polymer, the photopolymerization monomer and the photopolymerization initiator in spite of the form of use of ultraviolet ray hardening resin and also has the form of liquid state before being hardened by ultraviolet ray irradiation without any solvent added.

What is meant by the “ultraviolet ray hardening resin composite” to be used with the invention excludes the ultraviolet ray hardening resin composite having a solvent contained therein and is limited to the non-solvent ultraviolet ray hardening resin composite having no solvent added. This is because what recovers the adhesion of the print pattern of the transfer film is the non-solvent activation component in the non-solvent type ultraviolet ray hardening resin composite, which is typically a photopolymerization monomer. The ultraviolet ray hardening resin composite applicable to the four form of embodiment of the invention comprises the ingredient having the following composition;

| | | |
|---|---|---|
| (1) | Oligomer (photopolymerization pre-polymer) | 30-50 weight % |
| (2) | multi-functional acrylate (photopolymerization monomer) | 10-30 weight % |
| (3) | single functional acrylate (potopolymerization monomer) | 10-40 weight % |
| (4) | photopolymerization initiator | 0.5-5 weight % |
| (5) | non-reactive additives | 1-20 weight % |

The photopolymerization pre-polymer is the polymer which can be further hardened by photochemical action and is called “photopolymerization unsaturated polymer”, “base resin” or “photopolymerization oligomer”. This pre-polymer is a basic ingredient which affects many fundamental physical properties as a coat film after being hardened and an acrylic oligomer, a polyester oligomer, an epoxy acrylate oligomer and an urethane acrylate oligomer may be used independently or arbitrarily combined. Although the degree of polymerization of photopolymerization pre-polymer is not so high as final polymer, it is not a monomer and polymerized to some extent and therefore it has the suitable viscosity and therefore a dilution agent is required in consideration of the effectiveness of operation on its use.

The photopolymerization monomer serves as a dilution agent for photopolymerization pre-polymer while maintaining the practical effectiveness of operation of the resin composite and itself participates in polymerization. There are a single functional monomer having a single functional group and a multi-functional monomer having two or more functional groups. The single functional monomer serves to improve adhesion to the article and to impart softness to the coat film after being hardened and the multi-functional monomer serves as a bridge formation agent which bridges pre-polymer molecules. For instance, the poly acrylate such as a poly-acrylic acid methyl is used for easing a contraction action of the coat membrane caused by bridge formation. If the contraction power of the coat membrane becomes high, the adhesion of the coat membrane is reduced, but the poly-acrylate can usefully prevent this. These photopolymerization monomers serve as a dilution agent for adjusting the viscosity of the ultraviolet ray hardening resin composite and also serves as a functional ingredient (activation ingredient) for recovering the adhesion of the dried print pattern.

The photopolymerization initiator serves to absorb the ultraviolet ray to start a polymerization reaction and is also called “photopolymerization start agent”. Acetophenone, benzophenone, etc. may be used when the ultraviolet ray hardening reaction is a radical reaction, while diazo compound, etc. may be used when the ultraviolet ray hardening reaction is an ion reaction.

The ultraviolet ray hardening resin composite may have a sensitizer, a filler, an inactive organic polymer, a leveling agent, a thixotropy imparting agent, a thermal polymerization prohibition agent, etc added thereto.

Although the step of applying the non-solvent type ultraviolet ray hardening resin composite 20A may be carried out by means of either of photogravure roll, wire bar coating and spray, since the spray applying process consumes a lot of coating materials, the photogravure roll application process or the wire bar application process may be preferable for applying the coating material.

As the non-solvent type ultraviolet ray hardening resin composite 20A is applied on the print pattern 12, the photopolymerization monomer in the non-solvent type ultraviolet ray hardening resin composite 20A permeates into the dried ink of the print pattern 12 to dissolve the ink whereby the adhesion of the ink which is in the same wet state as immediately after printing the print pattern can be restored. Therefore, the non-solvent type ultraviolet ray hardening resin composite 20A can have the function equivalent to the conventionally used activating agent to thereby omit the application of the activating agent, the thinner, etc. and since each ingredient in the ultraviolet ray hardening resin composite including the photopolymerization monomer generally has the volatility far lower than the solvent etc., the degree of the recovered adhesion neither varies nor is lowered after its recovery, which enables the expectation of the stabilization of the activation, which cannot be expected in the solvent type one.

As the print pattern 12 is transferred on the article 10 and the ultraviolet ray 22 is irradiated thereon, the ultraviolet ray hardening resin composite is hardened in the state where each ingredient of the ultraviolet ray hardening resin composite 20A such as the photopolymerization monomer permeates into the ink of the print pattern 12 whereby both of the ultraviolet ray hardening resin composite and the ink are wholly united. This imparts mechanical surface protection function such as wear resistance, etc. and chemical surface protection function such as solvent resistance, medicine resistance, etc. to the decorative layer itself. The same functions as those of the first form of embodiment are true of this. Since the photopolymerization monomer itself participates in polymerization after the ultraviolet ray irradiation, this monomer is never separated and therefore later causes no harm.

Although FIGS. 2B and 2C don't illustrate the state where the ink ingredient of the print pattern 12 and the ultraviolet ray hardening resin composite 20A are wholly unified, if these figures try to show such state, then it becomes impossible for both to be distinguished from each other and it should understand that they are conveniently indicated in the state of layers.

After the ultraviolet ray 22 is irradiated onto the article having the print pattern 20 transferred thereto, a water shower 24 is injected onto the water-soluble film 14 of the transfer film 16 to thereby wash the water-soluble film 14 as shown in FIG. 2F, whereby the water-soluble film 14 is removed out of the surface of the article 10. Thereafter, as shown in FIG. 2G, a hot wind 26 is irradiated on the surface of the article 10 on which the print pattern 12 containing the ultraviolet ray hardening resin composite 20A is adhered to dry the surface of the article 10 whereby the product 10' having a decorative layer 30 is completed (refer to FIG. 3).

The ultraviolet ray 22 is preferably irradiated while the water-soluble film 14 of the transfer film 16 is wound around the article 10 on which the print pattern 12 containing the ultraviolet ray hardening resin composite 20A is transferred and thus it is preferably carried out after the article 10 is still underwater or before the water-soluble film 14 is water-washed and removed even though it comes out of the water. The ultraviolet ray 22 is irradiated by a conventional ultraviolet ray hardening equipment including light source lamps such as high-pressure mercury lamps or metal halide lamps and an irradiation machine (lamp house). The ultraviolet ray 22 can be irradiated onto the article 10 while the latter is underwater because the ultraviolet ray can penetrate under water.

In this manner, as the ultraviolet ray 22 is irradiated while the water-soluble film 14 is wound around the article, any dirt etc. cannot be adhered to the article so as to be kept being secured thereto before the print pattern 12 gets completely dry, the possibility of dirt adhesion can be reduced because the print pattern 12 is hardened when the water-soluble film 14 is removed whereby the decorative layer 30 of good appearance can be obtained easily. The irradiation of the ultraviolet ray 22 may be carried out after the water-soluble film 14 is water-washed out of the article 10 in case where the irradiation of the ultraviolet ray 22 is carried out under an environment having no dust or dirt such as a tunnel like a clean room.

The reason for using the non-solvent type ultraviolet ray hardening resin composite in the invention, but not the ultraviolet ray hardening resin composite having the solvent added thereto is as follows.

Since the ultraviolet ray hardening resin is hardened by the ultraviolet ray irradiation for a short time, if the added solvent is the low boiling one having the high volatility, the solvent will fully volatize before the article is forced underwater to thereby provide the poor transfer due to shortage of the adhesion while if the added solvent is the high boiling one difficult to volatize, the shortage of the adhesion when the article is forced underwater can be avoided, but the ultraviolet ray irradiation cannot be performed until the solvent volatilizes completely, and if the ultraviolet ray hardening type resin ingredient is hardened by the ultraviolet ray irradiation in the state of inadequate volatilization of the solvent, which is in the state where the solvent is involved, there will be produced defects such as surface roughness later. Thus, if there is used the ultraviolet ray hardening resin composite having the solvent added thereto, which is either of low boiling point or of high boiling point, there is a possibility of producing the health injury due to air pollution or human body inhalation and also of producing various problems on process or quality On the other hand, as already described partially, if the non-solvent type ultraviolet ray hardening resin composite is used, since the photopolymerization monomer can also serve as a dilution agent for the purpose of the degree adjustment of viscosity, more quantity of non-solvent ultraviolet ray hardening resin composite can be prepared in comparison with the solvent containing type one. This enables the recovery of the adequate and stable adhesion only by the action of the non-solvent activation ingredient in the non-solvent type ultraviolet ray hardening resin composite, which is typically the photopolymerization monomer. Furthermore, since the ultraviolet ray hardening resin composite 20A and the print pattern 12 are wholly united with each other and hardened and the photopolymerization monomer itself which has a function equivalent to the conventionally used solvent participates in polymerization, this photopolymerization monomer is never separated to thereby do no badness after that.

Figure 4:
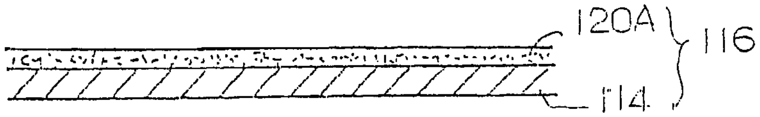
FIG. 4 partially illustrates a step of applying a topcoat on the product of FIG. 3 using the water pressure transfer technology by a third form of the invention.
Figure 4:
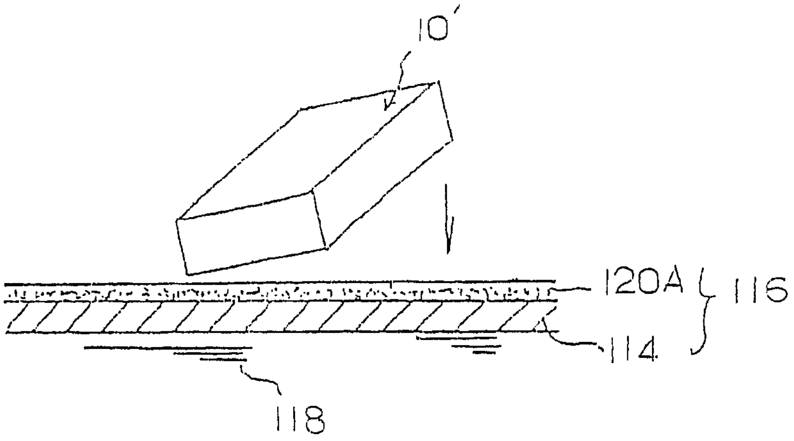
Figure 5:
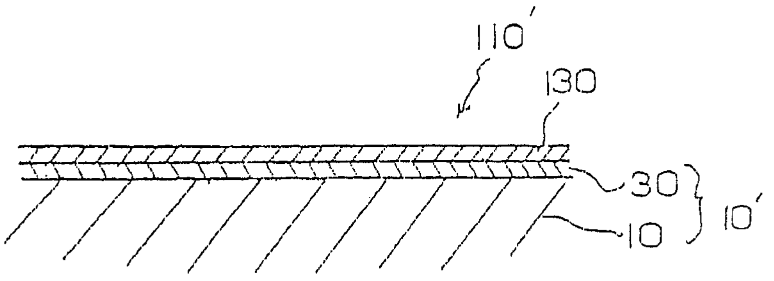
FIG. 5 is an enlarged cross sectional view of the product with the topcoat layer obtained by the method of FIG. 4.

In the first form of embodiment of the invention, by using the process of FIG. 4, there may be formed an ultraviolet hardening resin topcoat layer by a separate operation of water pressure transfer on a decorative layer obtained by transferring under water pressure the print pattern 12 activated by the ultraviolet ray hardening resin composite 20A so as to overcoat the decorative layer. The operation of the topcoat application by this water pressure transfer is done by using a transfer film 116 having transparent ultraviolet ray hardening resin composite 120A formed by being applied in the state of solid color (the non-pattern state) all over the whole surface of a plain water-soluble film 114 as shown in FIG. 4. This transfer film 116 is floated on the water surface immediately after the application of ultraviolet ray hardening resin composite 120A and at the timing when the water-soluble film 114 is made properly wet, the article 10' having the decorative layer applied thereto is forced into water 118. Thereafter, the ultraviolet ray irradiation, the water washing and the drying are performed like the steps of FIG. 2E and the succeeding figures, which are performed by the decoration operation by water pressure transfer whereby a water pressure transfer product 110' having a topcoat layer formed by being overcoated with the ultraviolet ray hardening resin topcoat layer 130 (see FIG. 5) is obtained.

The operation of topcoat application for the water pressure transfer may be performed by using a transfer film having ultraviolet ray hardening resin composite formed by being preliminarily hardened so as not to cause blocking after applying the ultraviolet ray hardening resin composite in the state of solid color (non-pattern state) on a plain water-soluble film 14 rather than applying the ultraviolet ray hardening resin composite in the state of solid color just before floating it on the water surface. In this case, a non-solvent type ultraviolet ray hardening resin composite or an photopolymerization monomer ingredient may be applied on the preliminarily hardened ultraviolet ray hardening resin composite of the transfer film in the solid color before floating it on the water surface to thereby recover the adhesion of the ultraviolet ray hardening resin and then the steps of FIG. 4C and the succeeding figures may be performed like the operation of the water pressure transfer for decoration.

With the topcoat layer 130 applied on the decorative layer 30 in this manner, depth is imparted to the appearance of the decorative layer 30 and in addition thereto, the mechanical and chemical surface protection of the decorative layer 30 is further improved.

The first form of embodiment of the invention can obtain various advantages by using the non-solvent type ultraviolet ray hardening resin composite. The term "non-solvent type" in the non-solvent type ultraviolet ray hardening resin composite used by this invention does not mean that there is absolutely zero of a "solvent ingredient" but is never exclusive of one having solvent ingredient added in order to escape from the invention or having solvent ingredient used for producing the monomer or the pre-polymer, but remained if there can be obtained the function of re-adhesion of the print pattern by the non-solvent activation ingredient in the ultraviolet ray hardening resin composite, which is typically photopolymerization monomer to the necessary and full degree. Similarly, the term "non-solvent type" does not mean that there is absolutely zero of "volatility" of the photopolymerization monomer, but means that it is not as high as the solvent and therefore it may have the volatility in such a degree as can be disregarded practically. Furthermore, it should be understood that although the operation of water pressure transfer requires plant and equipment investment or a safety control, an electronic ray hardening resin composite may be used in place of the ultraviolet ray hardening resin composite may include an electronic ray hardening resin composite because the electronic ray hardening resin composite containing photopolymerization pre-polymer and photopolymerization monomer as indispensable ingredients, which can omit an photopolymerization initiator by irradiating an electronic ray of higher energy on the resin composite and hardening it has the function of activation by the photopolymerization monomer and the photopolymerization monomer itself participates in polymerization serving like the original ultraviolet ray hardening resin composite containing the photopolymerization initiator.

Embodiment 1

Figure 3:
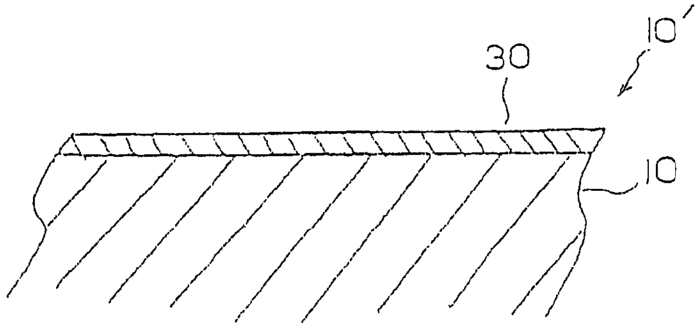
FIG. 3 is an enlarged cross sectional view of the product obtained by the method of FIG. 2.

In a concrete Embodiment 1 according to the second form of embodiment of the invention, the non-solvent type ultraviolet ray hardening resin composite which is the ultraviolet ray hardening type ink commercially available as "UV MAT-000 MREDIUM", the trade name of UV type screen ink from TEIKOKU INK MANUFACTURE CO., LTD., Japan was used, and the process was carried out in order of the steps shown in FIGS. 2A through 2G. This non-solvent type of ultraviolet ray hardening resin composite was applied or coated on the print pattern of the transfer film by a wire bar coating method just before introducing the transfer film into the transfer tub. The transfer film having the thus applied non-solvent type ultraviolet ray hardening resin composite was floated on the water surface of the transfer tub and after the print pattern recovers its adhesion with the ultraviolet ray hardening resin composite, the article was forced underwater through the transfer film as shown in FIG. 2D. After transfer, the article was taken out of the water, then the ultraviolet ray was irradiated on the article and water-washing and drying were performed to thereby obtain the water pressure transfer article (product) 10' as shown in FIG. 3.

Embodiment 2

In the Embodiment 2, the process was carried out in the same manner as the Embodiment 1 except to use as the non-solvent type ultraviolet ray hardening resin composite the ultraviolet ray hardening type ink commercially available under the name "UV PAL-000 MEDIUM", the trade name of UV type screen ink from TEIKOKU INK MANUFACTURE CO., LTD., Japan.

Describing the status of transfer in each of the Embodiments, the water pressure transfer could be accomplished in the same manner as the conventional method except that the operation of application of the resin composite on the transfer film was carried out with certain difficulty due to the high viscosity of the resin composite because the one on the market was used as it is.

As the adhesion of the decorative layer of each of the water pressure transfer articles (E) obtained by the Embodiments 1 and 2 was tested by the cross cut tape adhesion test method (1 mm cross 100 measures), it was confirmed that each of the articles (E) of the Embodiments had the same adhesion as the water pressure transfer article (B) having the print pattern transferred by the conventional activator, but having no topcoat and the water pressure transfer article (C) having conventional acrylic resin applied on the decorative layer.

As a ten-sheet piled gauze containing xylene was reciprocatively wiped on the surface of the product eight times while it is rubbed thereon as a solvent resistance test, it was confirmed that the product of either of the Embodiments had little damage of the decorative layer, which is not as good so the water pressure transfer article (C) having the conventional topcoat layer and showed solvent resistance as good as the conventional water pressure transfer product (C). The conventional water pressure transfer article (B) obtained by being activated by the conventional activating agent and having no topcoat applied thereon had very poor solvent resistance, which was naturally expected.

It was confirmed from these results that with the non-solvent type ultraviolet ray hardening resin composite used although it is required to be adjusted so as to have a proper composition for the original precise transfer, the print pattern of the transfer film can be activated to the state of making the transfer possible typically by the photopolymerization monomer and that the ultraviolet ray hardening resin composite and the print pattern are hardened while they are wholly united after the irradiation of the ultraviolet ray whereby the mechanical and chemical surface protection functions such as wear resistance and solvent resistance can be imparted to the obtained decorative layer.

Figure 6:
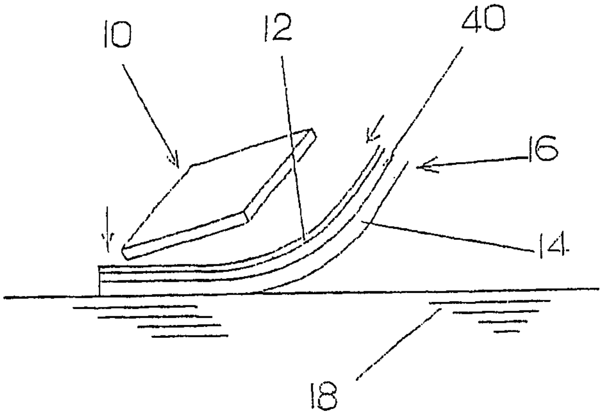
FIG. 6 is an outline view in which a water pressure transfer method according to a second form of the invention is briefly illustrated.

There is shown in FIG. 6 a water pressure transfer method according to the second form of embodiment of the invention. In the second form of the embodiment, the transfer layer of the transfer film 116 comprises the protection layer 40 for the topcoat and the print pattern 12 for decoration applied on the water soluble film 14. This water pressure transfer method is the one in which the transfer film 16 having the protection layer 40 for topcoat and the print pattern 12 for decoration applied on the water-soluble film 14 is supplied and floated on the water 18 in the transfer tub not illustrated so that the print pattern 12 is directed upwards and the article 10 for the print pattern 12 to be transferred under water pressure is forced into water 18 through the transfer film 16 to thereby carry out the water pressure transfer. The water-soluble film 12 may be the same as what is used with the first form of embodiment.

Although the protection layer 40 for topcoat may be of composite such as suitable dry hardening coat material and other composites which have wear resistance and chemical resistance, it may be preferably of transparent ink or ultraviolet ray hardening resin composite and more preferably of non-solvent ultraviolet ray hardening resin composite, which is the same as the material for recovering adhesion of the print pattern 16 as described later. This protection layer 40 may be applied on the whole surface of the water-soluble film 14 by proper application means. In general water pressure transfer, the print pattern 12 may be applied on the protection layer 40 on the water-soluble film 14 by photogravure printing and other proper means. This print pattern 12 also contains a plain (non-pattern) print layer other than the pattern in a strict meaning. In case that the protection layer 40 for topcoat is formed of ultraviolet ray hardening resin composite, the print pattern 12 is applied thereon in the state of preliminary drying the resin composite and therefore the print pattern 12 may be desirably printed by an ink jet system.

Figure 7:
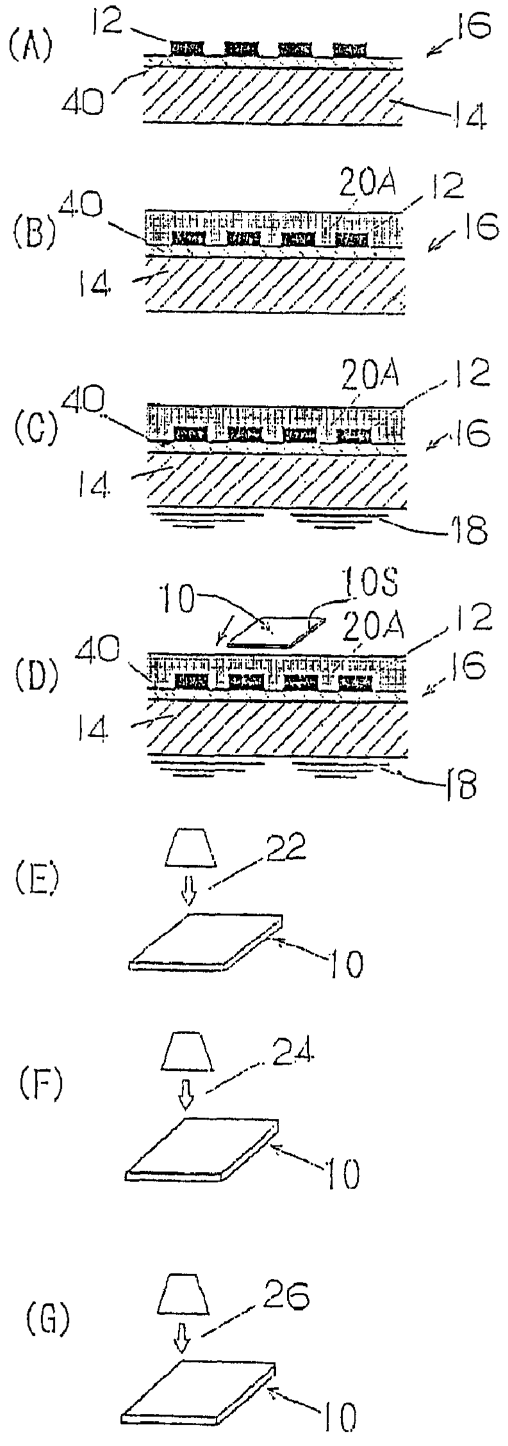
FIG. 7 illustrates the water pressure transfer method of FIG. 6 in order of steps.

Also in the second form of embodiment, the non-solvent type ultraviolet ray hardening resin composite may be applied for recovering adhesion of the print pattern 12 of the transfer film 16. A concrete example of the water pressure transfer method according to the second form of embodiment is shown in FIG. 7 and the protection layer 40 and the print pattern 12 applied on the water-soluble film 14 is in the state where they are dried (see FIG. 7A).

When the water pressure transfer is carried out, the non-solvent type ultraviolet ray hardening resin composite 20A is applied on the dried print pattern 12 of the transfer film 16 (see FIG. 7B). In the state where the adhesion of the print pattern 12 is recovered by the non-solvent type ultraviolet ray hardening resin composite 20A, the transfer film 16 is floated on the water 18 in the transfer tub (see FIG. 7C). Thereafter, the article 10 is forced underwater together with the transfer film 16 so that the print pattern 12 containing ultraviolet ray hardening resin composite 20A is engaged against the surface 10S of the article 10 (see FIG. 7D) to thereby transfer the print pattern 12 containing the ultraviolet ray hardening resin composite 20 and the protection layer 40 for topcoat and then the ultraviolet ray 22 is irradiated on the article 10 whereby the print pattern 12 containing the ultraviolet ray hardening resin composite 20A and the protection layer 40 for the topcoat on the resin composite are hardened (see FIG. 7E). In case that the protection layer 40 is formed of the ultraviolet ray hardening resin composite, the ultraviolet ray hardening resin composite of the protection layer 40 is fully hardened together with the ultraviolet ray hardening resin composite 20A for recovery of the adhesion by this ultraviolet ray irradiation. In order to explain that the protection layer 40 is hardened together with the ultraviolet ray hardening resin composite for adhesion recovery by the step of irradiating the ultraviolet ray, the description will be made about the protection layer 40 being formed of ultraviolet ray hardening resin composite.

Although not shown, the article is practically forced underwater while it may be conveyed by a reversely triangle-like conveyer or being supported by a robot arm. In some cases, the order of the step of applying the non-solvent type ultraviolet ray hardening resin composite 20A on the print pattern 12 (see FIG. 7B) and the step of floating the transfer film on the water (see FIG. 7C) may be made reversely and the non-solvent type ultraviolet ray hardening resin composite 20A may be applied by spray on the print pattern 12 of the transfer film 16 floated on the water to thereby recover the adhesion of the print pattern.

The "ultraviolet ray hardening resin composite" excludes the solvent containing type ultraviolet ray hardening resin composite like what is used for the first form of embodiment and therefore is limited to the non-solvent type ultraviolet ray hardening resin composite having no solvent added thereto. The reason is that the recovery of adhesion of the print pattern and the protection layer for topcoat is going to be based on the non-solvent activation component in the non-solvent type ultraviolet ray hardening resin composite that may be typically photopolymerization monomer. The ultraviolet ray hardening resin composite applicable to this invention comprises the ingredient which has the following composition. Since this ingredient is the same as what is used for the first form of embodiment, the detailed explanation is omitted.

| | | |
|---|---|---|
| (1) | Oligomer (photopolymerization pre-polymer) | 30-50 weight % |
| (2) | multi-functional acrylate (photopolymerization monomer) | 10-30 weight % |
| (3) | single functional acrylate (photopolymerization monomer) | 10-40 weight % |
| (4) | photopolymerization initiator | 0.5-5 weight % |
| (5) | non-reactive additives | 1-20 weight % |

As the non-solvent type ultraviolet ray hardening resin composite 20A is applied on the print pattern 12, the photopolymerization monomer that is the non-solvent activation ingredient in the non-solvent type ultraviolet ray hardening resin composite 20A permeates into the dried ink of the print pattern 12 and also into at least a part of the protection layer 40 for topcoat to dissolve them whereby the adhesion which is in the same wet state as the print pattern 12 and the protection layer 40 immediately after printing the print pattern 12 and applying the protection layer 40 can be recovered. Thus, as described in the first form of embodiment, the functions identical to the conventional activating agent can be accomplished. The application of the activating agent, thinner, etc. can be omitted. Since each ingredient in the ultraviolet ray hardening resin composites such as the photopolymerization monomer generally has volatility far lower than the solvent etc., the degree of adhesion recovered has neither variation nor reduction whereby the activation of the print pattern can be expected to be made stable.

As the ultraviolet ray 24 is irradiated on the article after transferring the print pattern 12 thereon, each ingredient of the ultraviolet ray hardening resin composite 20A such as the photopolymerization monomer permeates into the ingredient of the ink of the print pattern 12 and the protection layer 40 for topcoat whereby the ultraviolet ray hardening resin composite 20A and the ingredient of the ink of the print pattern 12 are hardened in the state where they are wholly united and also the ultraviolet ray hardening resin composite 20A and at lease a part of the protection layer 40 for topcoat are hardened in the state where they are wholly united. Thus, mechanical surface protection functions such as wear resistance, etc. and chemical surface protection functions such as solvent resistance, medicine resistance, etc. are imparted to the decorative layer itself and also adhesion of the protection layer 40 for topcoat to the print pattern 12 for the decorative layer can be improved. Simultaneously when the ultraviolet ray hardening resin composite 20A is hardened by the ultraviolet ray, the ultraviolet ray hardening resin composite of the protection layer 40 is also hardened. In FIGS. 7B and 7C, although the ink ingredient of the print pattern 12, the ingredient of the protection layer 40 for topcoat and the ultraviolet ray hardening resin composite 20A are not shown in the state where they are wholly united, it should be noted that they are shown to be conveniently in the layer state because they cannot be distinguished if they try to be shown in the united state in these figures. Moreover, as already described, since the photopolymerization monomer itself participates in polymerization, it is never separated, which prevents badness thereafter due to the separation.

Then, as shown in FIG. 7F, the water shower 24 is injected to wash the article by water to thereby remove the water-soluble film 14 of the transfer film 16 which the article is covered with. Subsequently, as shown in FIG. 7G, a hot air 26 is blown to the article 10 to which the print pattern 12 and the protection layer 40 for topcoat containing the ultraviolet ray hardening resin composite 20A are transferred to thereby dry the surface of article 10 whereby the product 10' having the decorative layer 30 and the topcoat layer 32 is completed (see FIG. 8).

Thus, when there are provided the decorative layer 30 and the topcoat layer 32, the topcoat layer 32 will impart depth to the appearance of the decorative layer 30, and will further strengthen the mechanical and chemical surface protection to the decorative layer 30.

Embodiment 3

Figure 8:
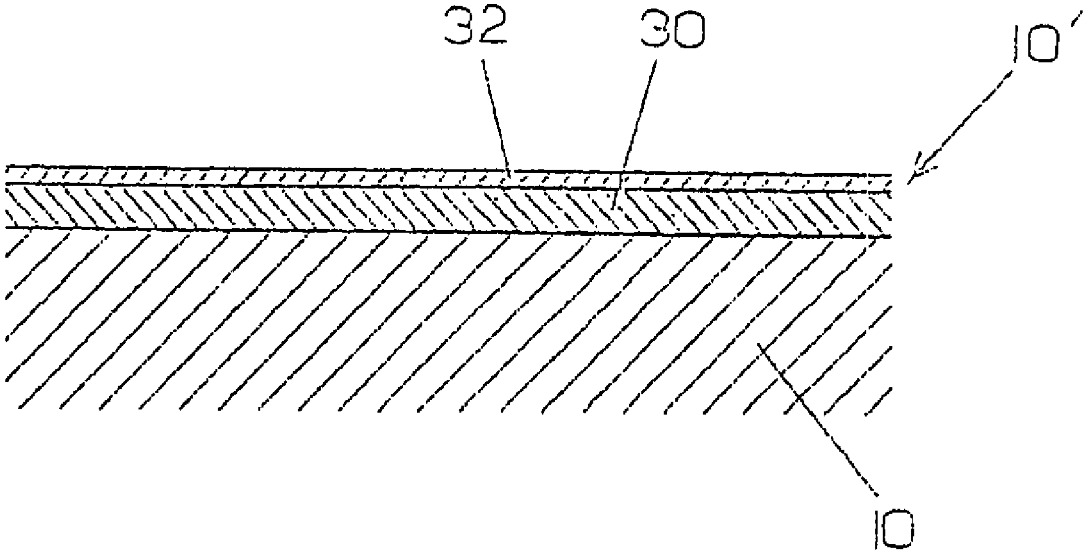
FIG. 8 is an enlarged cross sectional view of the product obtained by the method of FIG. 7.

In a concrete example, Embodiment 3 according to the second form of embodiment of the invention, on the plain water-soluble film having a main ingredient of polyvinyl alcohol was applied or coated in a uniform manner all over the whole surface a mixture of what is commercially available under the trade name “KLCF IMPROVEMENT 3 MEDIUM” and an ethyl acetate by THE INTECK CO., LTD., Japan by the ratio 1:1 as the protection layer for topcoat by using a wire bar coater having a wire bar of a diameter of 12 mm and wire number #8 and after naturally drying it under normal temperature atmosphere for 10 minutes, there was arbitrarily handwritten a pattern with a tip of a brush having an ink alkyd resin manufactured by THE INTECH CO., LTD., Japan and a brown ink called the trade name “KLCF IMPROVEMENT 3 BROWN” of nitrification cotton attached thereto whereby there was obtained the transfer film having the protection layer for topcoat and the ink pattern for decoration (what corresponds to the print pattern) laminated. The water pressure transfer was carried out in order of the steps shown in FIGS. 7A through 7G using the transfer film and in order to apply to the ink pattern for decoration of the transfer film to recover adhesion in the ink, there was used the non-solvent type ultraviolet ray hardening resin composite which is the ultraviolet ray hardening type ink commercially available under the trade name “UV PAL-000 MEDIUM”, the UV type screen ink from TEIKOKU INK MANUFACTURE CO., LTD. This non-solvent type ultraviolet ray hardening resin composite was applied on the ink pattern (print pattern) of the transfer film by the wire bar coating method just before introducing the transfer film into the transfer tub. The transfer film having the non-solvent type ultraviolet ray hardening resin composite thus applied was floated on the water surface of the transfer tub. After the ink pattern had adhesion recovered by this ultraviolet ray hardening resin composite, as shown in FIG. 7D, the article was forced underwater through the transfer film. After the ink pattern and the protection layer for topcoat were transferred in this manner, the article was taken out from the water, the ultraviolet ray was irradiated on the article and it was washed by water and dried whereby the water pressure transfer article (product) 10' as shown in FIG. 8 was obtained.

Embodiment 4

The water pressure transfer was performed in the same manner as Embodiment 3 except that there was used what was obtained by mixing the acrylics lacquer called the trade name “PLA-ACE” manufactured by THE MUSASHI TORYO CO., LTD., Japan as the protection layer for topcoat of the transfer film and ethyl acetate by the ratio of 1:1.

Embodiment 5

The water pressure transfer was carried out in the same manner as Embodiments 3 and 4 except that after applying as the protection layer for topcoat of the transfer film the ultraviolet ray hardening type ink called the trade name “UV PAL-000 MEDIUM” manufactured by and commercially available from THE TEIKOKU INK MANUFACTURE CO., LTD., Japan which is the same as the one being applied for the purpose of adhesion recovery (activation) of the water pressure transfer film, hardening by very feeble ultraviolet ray irradiation of 1% or less of the amount of irradiation required for original hardening of the composite was carried out and stopped just before finger touching dryness, a proper pattern prepared with a paint system software by using MC-10000 of a large-sized ink jet printer MAXART series manufactured by THE SEIKO EPSON CO., LTD., Japan and six colors of pigment system oiliness ink were printed on the protection layer and then they were dried under normal temperature atmosphere for 30 minutes whereby there was the transfer film having the topcoat layer and the ink pattern (corresponding to the print pattern).

In either of Embodiments 3 through 5, since two layers of the ink pattern and the protection layer for topcoat were dissolved, although some more time were required for recovering the adhesion of the ink pattern than that in case of transferring the transfer film having only the ink pattern provided thereon, the water pressure transfer according to either of the embodiments was carried out in good manner except for disappearance of the wrinkles of the pattern being overdue in the circumference of the portion especially having the deep color. Moreover, the water pressure transfer article (G) obtained in these embodiments had the topcoat layer applied all over the decorative layer simultaneously with transfer and it is confirmed that the water pressure transfer article according to Embodiment 3 had a low degree of gloss compared with the water pressure transfer articles according to the Embodiments 4 and 5, but had the feeling of gloss remarkably better than that of the water pressure transfer article (E) (see Embodiment 2) having no topcoat layer obtained by transferring the print pattern which the non-solvent type ultraviolet ray hardening resin composite permeated into by recovering the adhesion of the print pattern by the resin composite and also had depth of the appearance of the decorative layer imparted thereto.

As the adhesion of the decorative layer and the topcoat layer of the water pressure transfer article obtained by each of the embodiments was tested by a cross cut tape adhesion test method (1 mm cross 100 measures), it is confirmed that the article according to either of the embodiments had the same adhesion as the conventional water pressure transfer article (B) without any topcoat having the print pattern transferred by activating the print pattern by the conventional activator, the conventional water pressure transfer article (C) having the conventional acrylic resin applied on the decorative layer and the water pressure transfer article according to the Embodiments 2 or 3.

As a ten-sheet piled gauze containing xylene was reciprocatively wiped on the surface of the product eight times while it is rubbed thereon as a solvent resistance test, it was confirmed that the product of either of the Embodiments had shown the good solvent resistance equivalent to that of the conventional water pressure transfer article (F) having the topcoat layer of ultraviolet ray hardening type coating material.

In the Embodiments 3 through 5, the water pressure transfer was carried out using the transfer film having the protection layer for topcoat and the ink pattern for decoration (print pattern) laminated and after the ink pattern was activated by applying the ultraviolet ray hardening resin composite, but since, in either of the embodiments, there is the aim in the confirmation of the recovery of adhesion of the ink pattern (print pattern) and the protection layer for topcoat, the characteristic of winding the ink pattern and the protection layer for topcoat around the pattern-transferred body (article) under water pressure and the ability to harden the ultraviolet ray hardening resin composite, the ink pattern and the topcoat layer on the pattern-transferred body by the ultraviolet ray irradiation while they are wholly united with each other, there remain the room of an improvement in a degree of surface gloss and surface smoothness and therefore it should be understood that there can be imparted more excellent surface gloss, mechanical strength, solvent resistance, etc. by consideration of coating material, ink and ultraviolet ray hardening resin composites used as the topcoat layer, these kinds and their composition ingredient.

Figure 9:
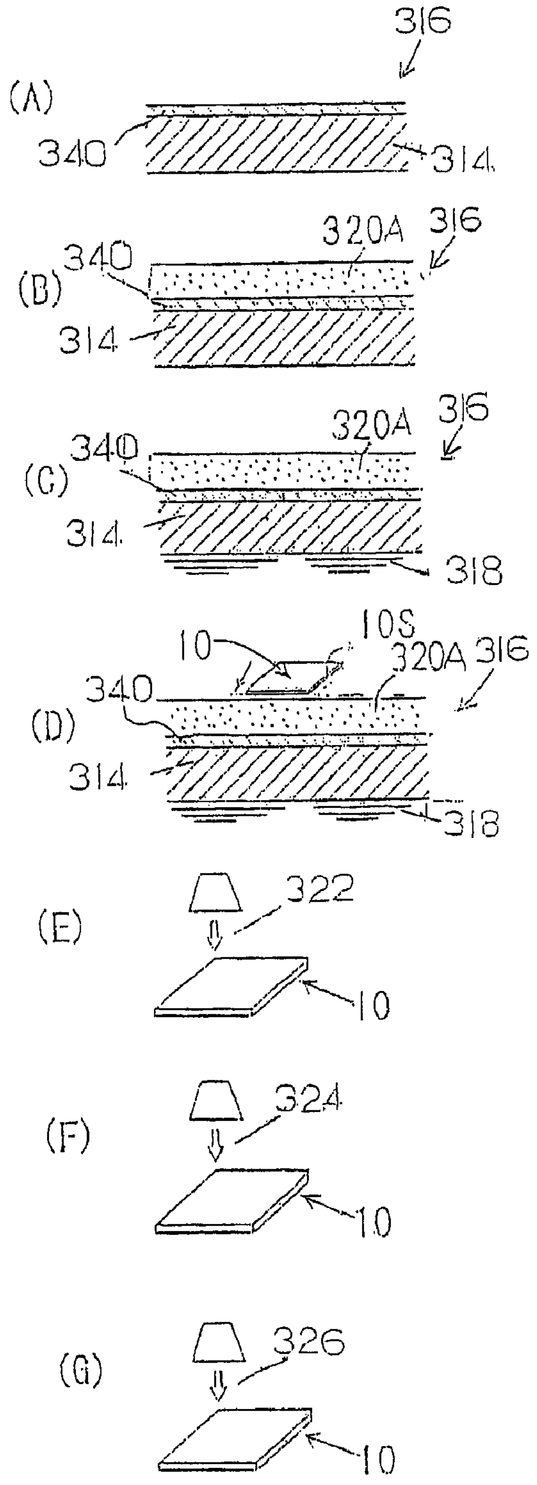
FIG. 9 illustrates the water pressure transfer method for a surface protection layer according to a third feature of the invention in order of steps.

There is shown in FIG. 9 a water pressure transfer method according to the third form of embodiment of the invention. This water pressure transfer method is the one in which a surface protection layer transfer film 316 having a surface protection layer 340 for protection of a surface of an article applied on a water-soluble film 314 is supplied and floated on a water 318 in a transfer tub not illustrated so that the surface protection layer 340 is directed upwards and the article 10 for the surface protection layer 340 to be transferred under water pressure is forced into the water 318 through the transfer film 316 to thereby carry out the water pressure transfer. The water-soluble film 312 may be the same as what is used with the first and second forms of embodiment.

The surface protection layer 340 may be of a proper composite such as dry hardening coat material, transparent ink which has wear resistance and medicine resistance. The surface protection layer 340 may be applied on the whole surface of the water-soluble film 314 by proper application means such as photogravure printing means. The surface protection layer 340 may be formed of ultraviolet ray hardening resin composite.

In the water pressure transfer method according to the third form of embodiment, the surface protection layer (the transfer layer) 340 applied on the water-soluble film 314 is in the dry state (see FIG. 9A).

When the water pressure transfer is carried out, the non-solvent type ultraviolet ray hardening resin composite 320A is applied on the dried surface protection layer 340 of the transfer film 316 (see FIG. 9B). In the state where the adhesion of the surface protection layer 340 is recovered by the ultraviolet ray hardening resin composite 320A, the transfer film 316 is floated on the water 18 in the transfer tub (see FIG. 9C) with the surface protection layer 340 upwardly directed. Thereafter, the article (undecorated article) 10 having no decoration applied is forced underwater together with the transfer film 316 so that the surface protection layer 340 containing the ultraviolet ray hardening resin composite 320A is engaged against the surface 10S of the article 10 (see FIG. 9D) to thereby transfer the surface protection layer 340 containing the ultraviolet ray hardening resin composite 320A and then the ultraviolet ray 322 is irradiated on the article 10 having the surface protection layer containing the ultraviolet ray hardening resin composite transferred thereon whereby the ultraviolet ray hardening resin composite 320A and the surface protection layer 340 are hardened (see FIG. 9E).

As described with reference to other forms of embodiment, the article 10 is forced underwater while it may be conveyed by a reversely triangle-like conveyer or being supported by a robot arm. Similarly, the order of the step of applying the ultraviolet ray hardening resin composite 320A on the surface protection layer 340 (see FIG. 9B) and the step of floating the transfer film on the water 318 (see FIG. 9C) may be made reversely and the ultraviolet ray hardening resin composite 320A may be applied by spray on the surface protection layer 340 to thereby recover the adhesion of the surface protection layer 340.

The ultraviolet ray hardening resin composite 320A applied on the surface protection layer 340 of the transfer film 316 for recovering an adhesion thereof serves to properly activate the dried surface protection layer 340 of the transfer film 316 to recover the adhesion of the surface protection layer 340 of the transfer film 316 and is the non-solvent type ultraviolet ray hardening resin composite, which is the same as used in the first and second forms of the invention or is the non-solvent type ultraviolet ray hardening resin composite, which is the same as used in the first and second forms of the invention. One example of the non-solvent containing type ultraviolet ray hardening resin composite is listed as follows.

| | |
|---|---|
| (1) Oligomer (photopolymerization pre-polymer) | 30-50 weight % |
| (2) multi-functional acrylate (photopolymerization monomer) | 10-30 weight % |
| (3) single functional acrylate (photopolymerization monomer) | 10-40 weight % |
| (4) photopolymerization initiator | 0.5-5 weight % |
| (5) non-reactive additives | 1-20 weight % |

Since a mechanism that the activating components of these ultraviolet ray hardening resin composite 320A recover the adhesion of the surface protection layer 340 is the same as the ultraviolet ray hardening resin composite for recovering the adhesion in the first and second forms, the detailed description of the function of the respective composites will be omitted. In this manner, the ultraviolet ray hardening resin composite 320A is immersed into the surface protection layer 340 whereby the resin composite 320A and the surface protection layer 340 are wholly united with each other, but if FIG. 9 tries to show such state, then it becomes impossible for both to be distinguished from each other and it should understand that they are conveniently indicated in the state of layers.

Figure 10:
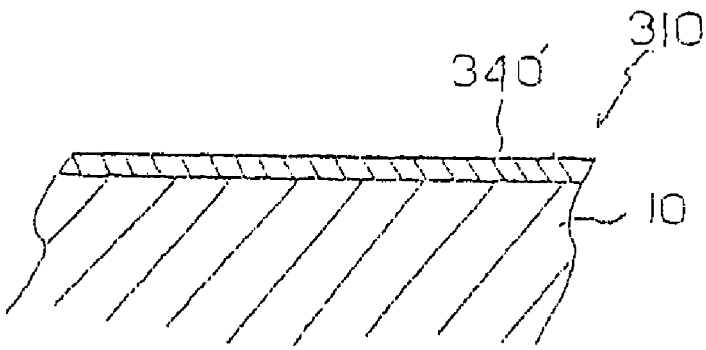
FIG. 10 is an enlarged cross sectional view of the product obtained by the method of FIG. 9.

Then, as shown in FIG. 9F, a water shower 324 is injected to wash the article 310 by water to thereby remove the water-soluble film 314 of the transfer film 316 which the article 310 is covered with. Subsequently, as shown in FIG. 9G, a hot air 326 is blown to dry the surface of the article onto which the surface protection layer 340 containing the ultraviolet ray hardening resin 320A is transferred whereby the product 310 having the surface protection layer 340 transferred is completed (see FIG. 10).

Thus, when there is applied the surface protection layer 340', the mechanical and chemical protection of the article 310 will be able to be strengthened. Particularly, since the ultraviolet ray hardening resin composite for recovering the adhesion is immersed into the surface protection layer 340 whereby the surface protection layer 340 and the ultraviolet ray hardening resin composite are wholly united with each other, the adhesiveness and the solvent resistance of the surface protection layer can be improved in the same manner as in the first and second forms of embodiment. The surface protection layer 340' has the surface never disordered and the high feeling of gloss imparted thereto because the surface protection layer 340' is applied to the article by water pressure transfer.

Figure 11:
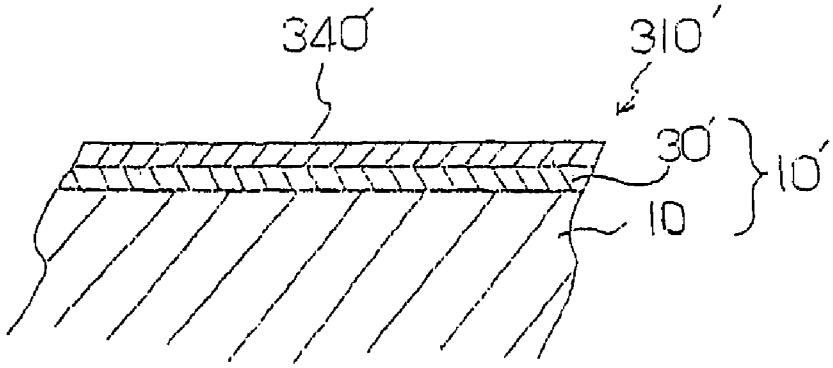
FIG. 11 is an enlarged cross sectional view of the product obtained by the method identical to that of FIG. 9, but by transferring the surface protection layer under water pressure on a decorated article.

Although, in the method according to the third form of embodiment, the article 10 has no decoration applied thereto, the surface protection layer 340 may be applied to the article 10' having the decorative layer 10' (such as the article of FIG. 3 according to the Embodiment 1) by water pressure transfer or other proper means. FIG. 11 shows the decorated article 310 thus surface protected.

As described with reference to the first through third forms, the ultraviolet ray hardening resin composite 320A for recovering the adhesion of the surface protection layer 340 is non-solvent type ultraviolet ray hardening resin composite, undesirable volatility of the activating component is reduced and recovery of the adhesion thereof is improved whereby the deterioration of the operation atmosphere is prevented.

Embodiment 6

In another concrete Embodiment 6 according to the third form of embodiment of the invention, on the plain water-soluble film having a main ingredient of polyvinyl alcohol was applied or coated what was obtained by mixing the acrylics lacquer called the trade name "PLA-ACE" manufactured by THE MUSASHI TORYO CO., LTD., Japan and ethyl acetate by the ratio of 1:1 as the surface protection layer of the transfer film by a gravure application method using a printing cylinder having #10 mesh of 60 micron and after drying it by means of a wind of normal temperature atmosphere blown for a few second to thereby obtain the surface protection layer transfer film. The water pressure transfer was carried out by thus obtained transfer film on the water pressure transfer article decorated by the water pressure transfer, but having no top-coat applied, in the same manner as the method shown in FIGS. 9A through 9G. At that time, the non-solvent type ultraviolet ray hardening resin composite of ultraviolet ray hardening type screen ink called the trade name "UV PAL-000 MEDIUM" manufactured by and commercially available from THE TEIKOKU INK MANUFACTURE CO., LTD., Japan was used for recovering the adhesion of the surface protection layer by its application.

This ultraviolet ray hardening type ink was coated on the surface protection layer resin of the transfer film by the wire bar coating method just before introducing the transfer film into the transfer tub. The transfer film having the ultraviolet ray hardening type ink thus applied was floated on the water surface of the transfer tub. After the surface protection layer had adhesion recovered by this ultraviolet ray hardening type ink, the article was forced underwater through the transfer film. After the surface protection layer was transferred on the surface of the article in this manner, the article was taken out from the water, the ultraviolet ray was irradiated on the article and it was washed by water and dried whereby the water pressure transfer article (product) 310' having the surface protection layer 340' applied on the decorative layer 30' was obtained as shown in FIG. 11.

In Embodiment 6, the surface protection layer 340 can be transferred under water pressure in a good manner and the thus transferred surface protection layer 340 had a uniform film thickness having less surface disorder (unevenness) and good feeling of gloss. It is confirmed that the water pressure transferred article (H) obtained by Embodiment 6 had a deepness imparted thereto so as to provide high class feeling by providing a uniform film thickness having less surface disorder to thereby impart a good feeling of gloss than the water pressure transferred article (G) having the surface protection layer for topcoat and the decorating print pattern transferred under water pressure in Embodiments 3 through 5. This had the feeling of gloss equivalent to that of the top-coated water pressure transferred article (C) formed by coating and drying acrylic resin on the decorative layer by conventional spray coating method.

As the adhesion of the surface protection layer of the water pressure transfer article obtained by Embodiment 6 was tested by a cross cut tape adhesion test method (1 mm cross 100 measures), it is confirmed that the adhesion onto the surface of the article (the surface of the undecorated article or the decorative layer of the decorated article) according to either of the embodiments was equivalent to that of the water pressure transfer article according to Embodiments 1 and 2.

As a ten-sheet piled gauze containing xylene was reciprocatively wiped on the surface of the product (the water pressure transfer article) eight times while it is rubbed thereon as a solvent resistance test, it was confirmed that the product of Embodiment 6 had shown the good solvent resistance equivalent to that of the products according to other Embodiments.

Embodiment 6 can be said to be an example of the repetition of the similar steps in which there was transferred under water pressure the plain print layer obtained by applying the transparent ink or transparent coating material on the decorative layer 30 of the article 10' obtained by the water pressure transfer of Embodiment 2.

POSSIBILITY OF UTILIZATION IN INDUSTRIES

According to the water pressure transfer method of the invention, since the non-solvent type ultraviolet ray hardening resin composite is applied to the print pattern and/or the surface protection layer of the transfer film to be transferred to the article to recover the adhesion of the ink of the print pattern and the ultraviolet ray hardening resin composite permeates into the print pattern, the surface protection function is imparted to the decorative layer formed by transferring the print pattern after ultraviolet ray hardening and therefore the availability in industries can be remarkably improved.

What is claimed is:

1. A water pressure transfer method for applying a transfer layer of a transfer film under water pressure to a surface of an article, the transfer layer being non-adhesive in a dry non-activated state and adhesive in a wet activated state, the method comprising the steps of:

a) providing a non-solvent type ultraviolet ray or electronic ray hardening resin composite including photo-polymerization pre-polymer, photo-polymerization monomer, photo-polymerization initiator and additives excluding solvent, said hardening resin composite having said photo-polymerization pre-polymer and photo-polymerization monomer present in the following blend ratio:

photo-polymerization pre-polymer 30-50 weight % and photo-polymerization monomer 20-70 weight % based upon the total weight of the hardening resin composite;

b) providing the transfer layer in the non-adhesive dry non-activated state;

c) coating said transfer layer with said hardening resin composite with said photo-polymerization monomer wetting said transfer layer to the adhesive wet activated state, said hardening resin composite permeating through said transfer layer to wholly unite with said transfer layer;

d) transferring said transfer layer from step (c) under water pressure to said surface of said article; and e) irradiating said transferred layer from step (d) on said surface of said article with an ultraviolet ray or electronic ray to harden said hardening resin composite and form the transferred transfer layer wholly united with said hardening resin composite on said surface of said article.

2. A water pressure transfer method as set forth in claim 1, wherein said transfer layer is a print pattern whereby a decorative layer is formed on the surface of said article.

3. A water pressure transfer method as set forth in claim 1, wherein said transfer layer is a combination of a print pattern and a top-coating surface protection layer provided under said print pattern whereby a decorative layer having the top-coating surface protection layer thereon is formed on the surface of said article.

4. A water pressure transfer method as set forth in claim 1, wherein said transfer layer is a surface protection layer whereby the surface protection layer is formed on the surface of said article.

5. A water pressure transfer article characterized by having a surface formed by the water pressure transfer method of any one of claims 1, 2, 3, or 4.

6. A water pressure transfer method for applying a transfer layer of a transfer film under water pressure to a surface of an article, the transfer layer being non-adhesive in a dry non-activated state and adhesive in a wet activated state, the method comprising the steps of:

a) providing a non-solvent type ultraviolet ray or electronic ray hardening resin composite including photo-polymerization pre-polymer, photo-polymerization monomer, photo-polymerization initiator and additives excluding solvent, said hardening resin composite having said photo-polymerization pre-polymer and photo-polymerization monomer present in the following blend ratio:

photo-polymerization pre-polymer 30-50 weight % and photo-polymerization monomer 20-70 weight % based upon the total weight of the hardening resin composite;

b) providing the transfer layer in the non-adhesive dry non-activated state as a dry print pattern, a dry top-coating surface protection layer or a combination of a dry print pattern and a dry top-coating surface protection layer;

c) coating said transfer layer with said hardening resin composite with said photo-polymerization monomer wetting said transfer layer to the adhesive wet activated state, said hardening resin composite permeating through said transfer layer to wholly unite with said transfer layer;

d) transferring said transfer layer from step (c) under water pressure to said surface of said article; and e) irradiating said transferred layer from step (d) on said surface of said article with an ultraviolet ray or electronic ray to harden said hardening resin composite and form the transferred transfer layer wholly united with said hardening resin composite on said surface of said article.

7. A water pressure transfer method as set forth in claim 6, wherein said hardening resin composite permeates through said transfer layer to wholly unite with said transfer layer to form a single layer.

8. A water pressure transfer method as set forth in claim 7, wherein said hardening resin composite permeates and wholly unites with said transfer layer to form said single layer as a decorative layer on said surface of said article.

9. A water pressure transfer method as set forth in claim 1, wherein said hardening resin composite permeates through said transfer layer to wholly unite with said transfer layer to form a single layer.

10. A water pressure transfer method as set forth in claim 9, wherein said hardening resin composite permeates and wholly unites with said transfer layer to form said single layer as a decorative layer on said surface of said article.

* * * * *